Dec. 17, 1963
H. J. B. BIEKART ETAL
3,114,681
PROCESS OF RECOVERING UNREACTED AMMONIA FROM
A UREA SYNTHESIS MELT BY A TWO STAGE
RECTIFICATION OPERATION
Filed May 15, 1958
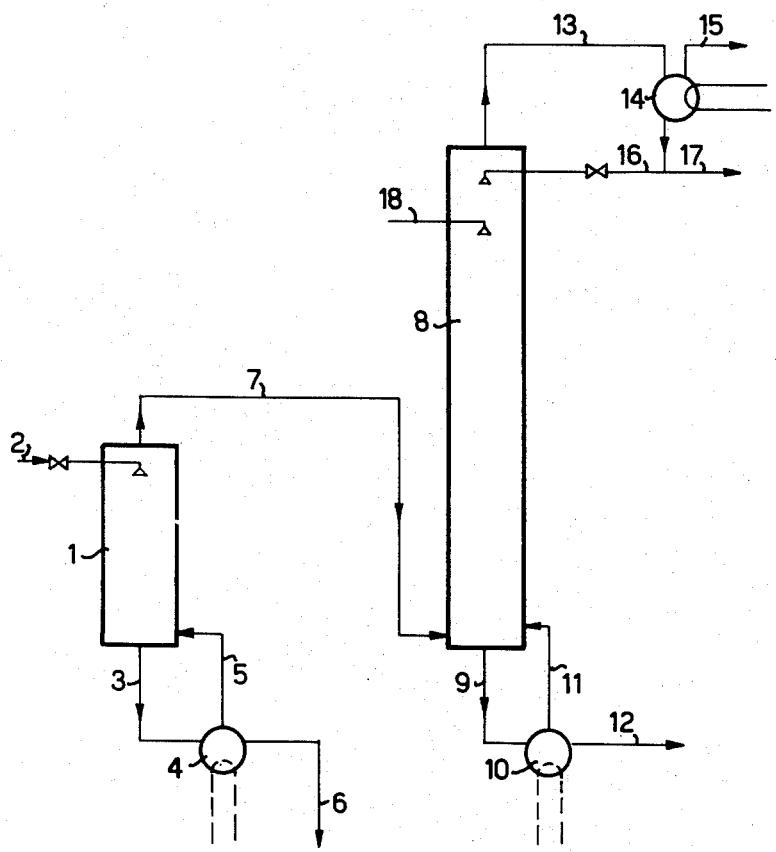
Inventors
Hendrik J. B. Biekart
Teunis Bakker
Petrus J. C. Kaasenbrood
By Cushman, Darby & Cushman
Attorneys

United States Patent Office 3,114,681
Patented Dec. 17, 1963

3,114,681
PROCESS OF RECOVERING UNREACTED AMMONIA FROM A UREA SYNTHESIS MELT BY A TWO STAGE RECTIFICATION OPERATION
Hendrik J. B. Biekart, Beek, Teunis Bakker, Geleen, and Petrus J. C. Kaasenbrood, Sittard, Netherlands, assignors to Stamicarbon N.V., Heerlen, Netherlands
Filed May 15, 1958, Ser. No. 735,403
Claims priority, application Netherlands May 18, 1957
2 Claims. (Cl. 202—67)

The present invention relates to a process of preparing urea from carbon dioxide and ammonia.

In this preparation, which is usually effected by leading carbon dioxide and liquid ammonia into an autoclave in which these substances are heated at a temperature of over 150° C., at a pressure of at least 160 atm., substantially all of the carbon dioxide is first bound by the ammonia to form carbamate. Subsequently a conversion of carbamate into urea and water takes place. However, this latter conversion is incomplete. Its efficiency, i.e. the percentage of carbon dioxide converted into urea (hereinafter to be called the synthesis efficiency) may be increased by the use of excess ammonia, such as an $NH_3/CO_2$ ratio higher than 2. However, even then there is incomplete conversion of carbamate into urea with the result that the melt leaving the synthesis autoclave contains, in addition to water, the following three components: urea, carbamate and the excess ammonia.

If the abovementioned melt is expanded to atmospheric pressure, there is formed, in addition to a solution of urea in water, a gaseous mixture of ammonia and carbon dioxide. Generally, this gaseous mixture is led through an acid, e.g. sulphuric acid, so that the ammonia is bound and a fertilizer is obtained. However, if the $NH_3/CO_2$ ratio is 2, for example, this treatment of the gaseous mixture with acid results in the production of about 270 tons of ammonium sulphate per 100 tons of urea. Thus, this process involves the disadvantage of coupling the urea production with the substantial production of another nitrogenous fertilizer.

The gaseous mixture obtained by expanding the melt to a pressure of one or a few atmospheres may also be separated into ammonia and carbon dioxide. This may be accomplished, for example, by contacting the mixture with a solution of ammonium nitrate, in which the ammonia is absorbed. The thus aborbed ammonia may then be expelled from the nitrate solution and returned to the synthesis autoclave. However, the expulsion of the ammonia is very costly. Furthermore, the pressure at which this gaseous ammonia becomes available is so low that the gas must be compressed before it can be liquefied and this also involves high cost.

Many processes aimed at preventing the abovementioned disadvantages have previously been proposed. One such process is described in British Patents 758,670 and 753,386. According to these patents, the melt leaving the autoclave is introduced into a rectifying column in which the melt is expanded to a pressure of, for example, 20 atm. Liquid ammonia or ammonia to which water has been added is refluxed in the top of the rectifying column. This serves to free the rising gases of $CO_2$, so that practically $CO_2$-free ammonia issues from the top of the rectifying column. The resulting $CO_2$-free ammonia can be liquefied by cooling, without compression. In the bottom part of the rectifying column, a solution of urea, water, carbamate and ammonia collects. From this solution, there can be recovered at atmospheric pressure a gas mixture which contains, in addition to the remainder of the ammonia, the full mount of carbon dioxide not converted into urea.

One of the disadvantages of the abovementioned process is that the urea solution collecting in the bottom part of the rectifying column is heated rather intensely since all of the heat needed to evaporate the liquid ammonia introduced into the top of the rectifying column must be supplied to the column by heating this urea solution. This heating of the urea solution, however, results in the disadvantage of biuret formation which strongly detracts from the commercial value of urea.

The principal object of the present invention is to provide a process for treating the urea synthesis melt and waste gases resulting therefrom whereby the abovementioned disadvantages are effectively eliminated. Other objects will also be apparent from the detailed description which follows.

According to the invention, the melt from the autoclave is introduced into the top of a first rectifying column and expanded to a pressure of 12–30 atm. The bottom product of this first rectifying column is heated to a temperature of 110° to 150° C., and continuously discharged. The gases issuing from this first column are washed with liquid ammonia in a second rectifying column, from which $CO_2$-free, or practically $CO_2$-free, gaseous ammonia issues at the top, while the bottom product of this second rectifying column is heated to a temperature of 75–105° C., and is continuously discharged as a crystal-free carbamate solution. By "carbamate solution" is here to be understood the solution of compounds, such as carbamate and carbonate, which results if ammonia and carbon dioxide in a molar ratio of at least 2:1 are dissolved in water.

The process of the invention may be so modified that water is introduced into the top of the second rectifying column, the water serving to perform part of the task of the refluxed ammonia, i.e. freeing the rising gases of $CO_2$. In this way, a smaller reflux of ammonia is sufficient. This means that less heat need be supplied to the bottom part of the second rectifying column and less heat removed from the ammonia condenser. It is possible to use instead of water an aqueous solution of either ammonia or urea. If at some point in the urea preparation process, e.g. in the condensation of the vapors evolved in the concentration of the urea solution, urea solutions are obtained which contain too much biuret, it is particularly advantageous to introduce such a urea solution into the top of the second rectifying column, provided the carbamate-urea solution discharged from the bottom of this column is returned to the synthesis autoclave where the biuret may be re-converted into urea. This re-conversion may even occur in the second rectifying column depending on the biuret content of the urea solution.

The process of the invention offers a number of highly desirable advantages. Thus, as mentioned above, the amount of heat required to evaporate the liquid ammonia in the second rectifying column, this amount of heat being rather great compared to the amount of heat required in the first rectifying column, is supplied at a place, where no urea to be processed to the final product is present. Thus, this supply of heat does not give rise to undesirable biuret formation. In addition, the temperature of the bottom product of the second rectifying column is lower than the temperature of the bottom product of the rectifying column used in the process of the aforementioned British patents. Consequently, it is possible to use either a considerably smaller heating surface or steam of lower pressure for heating.

Furthermore, the present process has the great advantage that, in addition to the pure ammonia which is recovered from the top of the second rectifying column, an extra amount of ammonia and carbon dioxide can be recovered at high pressure in the liquid state, viz. as a carbamate solution. This solution may be used for converting, for example, sodium chloride to soda, gypsum into calcium carbonate and ammonium sulfate, or calcium nitrate into calcium carbonate and ammonium nitrate. It is also possible to subject this solution to the action of nitrous gases in order to prepare ammonium nitrate. In all these cases, the usual cumbersome absorption of ammonia and carbon dioxide in water may be omitted. Further, the amount of this carbamate solution may be varied by regulating the bottom temperature of the first rectifying column. This makes it possible to have an independent control within rather wide limits of any process coupled to the urea preparation.

Preferably, the process of the invention is operated in such a way that the crystal-free carbamate solution discharged from the second rectifying column is returned to the synthesis autoclave apart from the liquefied top product of the second rectifying column.

In connection with the foregoing, it is to be noted that British Patent No. 756,934 describes a process involving the return of a crystal-free solution of carbamate in water to the synthesis autoclave. However, in this known process, the carbamate solution also contains the entire quantity of expelled ammonia. Partly because of this, the amount of water needed to keep the solution free of crystals is very great. Also, in this known process, an important part of the fresh ammonia to be supplied to the autoclave is introduced into the carbamate solution and the process becomes more difficult to operate as the $NH_3/CO_2$ ratio used is increased. Thus, while the carbamate content of the melt leaving the synthesis autoclave decreases as the $NH_3/CO_2$ ratio increases, the amount of ammonia contained in the melt also increases substantially at the same time, with the result that more water is needed to prevent crystallization of the carbamate solution. When this water reaches the autoclave, the synthesis efficiency is reduced. Consequently, the amount of carbamate in the melt rises and this in turn results in an increase in the amount of water that must be added to the carbamate solution, said water again unfavorably influencing the synthesis efficiency in the synthesis autoclave, etc.

It will be clear from the foregoing that the preferred way of operating the present process permits the use of considerably higher $NH_3/CO_2$ ratios than the process described in the abovementioned British Patent No. 756,934 inasmuch as the amount of water to be added to the carbamate solution which is returned to the autoclave is considerably smaller in the process of the invention and is, moreover, practically independent of the excess of ammonia used. Furthermore, if the efficiency of the ammonia, i.e., that percentage of the ammonia supplied to the circulation process and converted into urea, is to raised, in order to reduce the amount of ammonia processed to fertilizer or the amount of $NH_3/CO_2$ gas mixture that has to be separated at low pressure, it is not necessary, in the present invention, to raise the $NH_3/CO_2$ ratio to an extreme value of, for example, 6 as in the case in the process of British Patent No. 758,670. In the latter process, no return of ammonia bound as carbamate takes place, so that the abovementioned ammonia efficiency can be raised only by raising the $NH_3/CO_2$ ratio. The higher this ratio, the higher the pressure has to be made, at a given temperature in the autoclave, in order to keep the reaction mixture condensed. If, conversely, the pressure is kept constant, the temperature has to be decreased, as otherwise the amount of the liquid phase formed would be too small. As a result, the synthesis efficiency decreases. Furthermore, an increase of the $NH_3/CO_2$ ratio involves the disadvantage of requiring a larger synthesis autoclave. Additionally, the steam production per kg. of urea produced is decreased since, of the heat released in the formation of carbamate from ammonia and carbon dioxide, the amount of heat removed by the excess of ammonia is greater thus leaving a smaller number of calories to be used in the formation of steam. Additionally, this entrained heat must be removed when the expelled ammonia is liquefied and this involves extra cost for cooling water.

According to the invention, the crystal-free carbamate solution should be kept apart from the resulting liquid ammonia. Otherwise, crystallization of carbamate will occur, unless the liquids are mixed only after heating. In general, operations are simplified if the ammonia recovered from the second rectifying column and liquefied is conveyed to the ammonia storage vessel, and the carbamate solution is led to the autoclave separately.

It has also been proposed (published Japanese patent application 125/54, referred to in C.A. 1955, p. 11007[d]) first to lead the melt coming from the urea synthesis into the top of a rectifying column while expanding it, and next to lead the gas mixture issuing from the top of this column, which mixture consists mainly of $NH_3$, but is contaminated with $CO_2$, into a washing column filled with liquid $NH_3$, and, if desired, through a second washing column filled with $NH_3$ containing water, in which treatment the $CO_2$ to be removed crystallizes in the first washing column as carbamate crystals, the same being removed from the bottom of the column as a suspension of carbamate crystals in liquid $NH_3$. This treatment suffers from the disadvantage that the apparatus is easily fouled due to deposition of carbamate crystals on the cooling spiral in the bottom part of the washing column, and the conduits through which the carbamate suspension is pumped are easily blocked. The process of the invention avoids this disadvantage since the treatment of the waste gases is carried out under such conditions that the $CO_2$ removed by washing is withdrawn as a crystal-free carbamate solution. Thus, in contrast to the process described in the abovementioned Japanese patent application, the mixture of $NH_3$ contaminated with $CO_2$ coming from the first rectifying column, is led into the bottom part of the second rectifying column where the rising gases are washed with a refluxed amount of liquid $NH_3$, a solution of $NH_3$ in water or a solution of $NH_3$ and urea in water while the column is maintained at a temperature which is sufficiently high to keep the carbamate that is formed in solution.

By way of example, the invention is further described in the attached diagrammatic drawing wherein the numeral 1 represents a first rectifying column filled with, for example, Raschig rings, plates or the like. The melt is supplied from the autoclave through a conduit 2 and expands practically adiabatically to a pressure of 12–30 atm. The temperature prevailing in the top of the first rectifying column is then 85–110° C. The liquid bottom product flows through a conduit 3 to a heater 4, where it is heated to a temperature of 110–150° C. The vapors evolved in this heating treatment are returned through a conduit 5 to the first rectifying column 1, and the liquid product flowing from the heater 4 is passed through a conduit 6 to a device in which it is expanded to atmospheric pressure and further processed.

The gas mixture issuing from the first rectifying column 1 is led, through a conduit 7, into the bottom part of a second rectifying column 8, which likewise contains Raschig rings, plates or the like. The liquid bottom product of the second rectifying column 8 flows through a conduit 9 to a heater 10, in which it is heated to a temperature of 75–105° C. The vapors evolved in this heating are returned, through a conduit 11, to the second rectifying column 8, while the carbamate solution flowing through heater 10 is discharged through a conduit 12. The gaseous ammonia, which is completely or virtually free of $CO_2$, is then passed through a conduit 13, to a condenser 14, in which the ammonia is condensed. The inert gases are discharged through a conduit 15, while the liquid ammonia is partly returned to the second rectifying column, through a conduit 16, and partly fed into an ammonia storage vessel (not shown), through a conduit 17.

If desired, a conduit 18 may be employed to supply water or a urea solution to the second rectifier column 8.

It will be appreciated that various modifications may be made in the invention described herein without deviating from the scope thereof as defined in the following claims wherein.

We claim:

1. In a process for recovering unreacted ammonia from a urea synthesis melt obtained by reacting ammonia and carbon dioxide in an autoclave using excess ammonia wherein said melt is rectified in a first rectifying column to give a bottom product containing urea and a top product comprising a gaseous mixture of unreacted ammonia and carbon dioxide and said gaseous mixture is removed from said column and further treated to recover substantially carbon-dioxide free ammonia, the improvement which comprises maintaining the bottom product in said first column at a temperature between 110° and 150° C., feeding the gaseous mixture obtained as top product into the bottom of a second rectifying column, maintaining the temperature at the bottom of said second rectifying column higher than the temperature at the top thereof; allowing said gaseous mixture to pass upwardly through said second column and washing said gaseous mixture as it flows upward in said second column by contacting the mixture with liquid, refluxed ammonia flowing downwardly from adjacent the top of said second column whereby substantially carbon dioxide-free ammonia gas is obtained as top product in said second rectifying column and a crystal-free carbamate solution, essentially free of urea, is obtained as the bottom product, withdrawing said ammonia gas from the top of said second rectifying column, maintaining the bottom product in said second rectifying column at a temperature between 75° and 105° C., and withdrawing said heated bottom product from said second column as said crystal-free carbamate solution.

2. The process of claim 1 wherein water is fed into the top of the second rectifying column so that the gaseous mixture is washed with liquid, refluxed ammonia and water.

References Cited in the file of this patent

UNITED STATES PATENTS

| | | |
|---|---|---|
| 2,807,574 | Hirano et al. | Sept. 24, 1957 |

FOREIGN PATENTS

| | | |
|---|---|---|
| 753,342 | Great Britain | July 25, 1956 |
| 758,670 | Great Britain | July 28, 1956 |
| 753,386 | Great Britain | Oct. 10, 1956 |
| 535,407 | Canada | Jan. 8, 1957 |
| 800,446 | Great Britain | Aug. 27, 1958 |

OTHER REFERENCES

Redeman et al.: Ind. and Eng. Chem., vol. 50, pages 635–6, April 1958.